United States Patent [19]

Nakajima

[11] Patent Number: 4,861,560
[45] Date of Patent: Aug. 29, 1989

[54] LIQUID SUPPLY DEVICE
[75] Inventor: Masahiko Nakajima, Tokyo, Japan
[73] Assignee: Nakajima Doko Company Limited, Tokyo, Japan
[21] Appl. No.: 220,512
[22] Filed: Jul. 18, 1988
[30] Foreign Application Priority Data Jul. 16, 1987 [JP] Japan ............................. 62-177910

[51] Int. Cl.$^4$ ............................................. G05D 7/01
[52] U.S. Cl. .................................. 422/111; 422/112; 422/113; 422/122
[58] Field of Search ............... 422/110, 111, 112, 113, 422/118, 45, 236, 237, 239, 122, 202; 222/394, 397, 399

[56] References Cited

U.S. PATENT DOCUMENTS

| | | | |
|---|---|---|---|
| 157,349 | 12/1874 | Pietsch | 422/112 |
| 228,315 | 6/1880 | Collins | 422/112 |
| 2,455,975 | 12/1948 | Buehl et al. | 422/239 |
| 3,291,572 | 12/1966 | Fatica | 422/202 |
| 3,453,086 | 7/1969 | Harm | 422/113 |
| 4,466,556 | 9/1984 | Söchting | 422/122 |
| 4,792,435 | 12/1988 | Nakajima | 422/122 |

Primary Examiner—David L. Lacey
Assistant Examiner—Gregory Muir
Attorney, Agent, or Firm—Cushman, Darby & Cushman

[57] ABSTRACT

A liquid supply device comprises a sealed vessel containing a reactive liquid, a guide cylinder disposed to the inside of the sealed vessel, a piston adapted to slide along the inside of the guide cylinder depending on the change of the pressure in the sealed vessel, a spring for urging the piston toward the inside of the sealed vessel, a pressure-generating catalyst adapted to move into and out of the reactive liquid interlocking with the piston for decomposing the reaction liquid to evolve gases upon contact with the reactive liquid, and a delivery apparatus for sending out the reactive liquid out of the vessel due to the increase in the pressure inside the vessel upon evolution of the gas.

The reactive liquid evolving gases is supplied continuously without using a pump or like other positive driving apparatus, but due to the pressure of gases evolved from the reaction solution per se, with no noisy mechanical sounds and operational energy.

8 Claims, 4 Drawing Sheets

LIQUID SUPPLY DEVICE

BACKGROUND OF THE INVENTION

1. Field of the Invention

The present invention concerns a liquid supply device and, more particularly, it relates to a liquid supply device suitable to the supply of an aqueous solution, for example, containing hydrogen peroxide to an oxygen generation system.

2. Description of the Prior Art

It has generally been known oxygen generation system, for example, as disclosed in Japanese Utility Model Publication No. Sho 55-26445 (1980) for decomposing aqueous hydrogen peroxide using a manganese compound such as manganese dioxide or potassium permanganate as the catalyst, or as disclosed in Japanese Patent Publication No. Sho 52-42155 (1977) for decomposing aqueous hydrogen peroxide at a high concentration of from 30 to 50% by using a platinum type catalyst.

However, in the former device using the manganese compound as the catalyst, if the concentration of the aqueous hydrogen peroxide exceeds 5%, the decomposing reaction is taken place at an explosive rate and, accordingly, it is obliged to reduce the concentration of the aqueous hydrogen peroxide to about 3%. However, use of aqueous hydrogen peroxide at such a low concentration, results in a problem that the volume of the aqueous hydrogen peroxide vessel is increased for obtaining a required flow rate of oxygen gas and the size of the oxygen generation system can not be decreased.

Furthermore, in the latter type device using the platinum group catalyst, although it is necessary to increase the catalyst reaction area as great as possible in order to completely decompose aqueous hydrogen peroxide at a restricted flow rate and generate gaseous oxygen efficiently for a long period of time, no such supported catalyst has been known and stable generation of oxygen has been impossible.

In view of the above, the present inventor has already proposed an oxygen generating system using a supported-catalyst comprising a support with a great pore size composed of sintered ceramic grains and a platinum catalyst supported thereon for decomposing aqueous hydrogen peroxide and evolving oxygen (Japanese Patent Application Sho 60-58931; corresponding to allowed U.S. patent application Ser. No. 843,024, filed on Mar. 24, 1986), now U.S. Pat. No. 4,792,435.

The oxygen generating system proposed by the present inventor has various advantageous effects in that it is small in the size and reduced in the weight, as well as capable of supplying oxygen at a sufficient flow rate stably over a long period of time.

However, in the proposed oxygen generating system, since a liquid supply device having a motor-driven tube type pump (peripheral pump) is used for supplying aqueous hydrogen peroxide to the inside of a reaction chamber containing a supported catalyst, it requires an electric power source for driving the pump and results in a problem that the driving control is difficult to cause frequent failures. Furthermore, since noises are resulted upon motor driving, etc., it is not quite satisfactory depending on the application use such as medical use.

SUMMARY OF THE INVENTION

The present invention has been achieved in view of the foregoing present situations and the object of the invention is to provide a liquid supply device small in size and reduced in cost and capable of continuously deliverying the entire volume of reactive liquid in a tightly sealed vessel without requiring a pump, a driving source therefor, etc. and with no generation of noises.

The foregoing object of the present invention can be attained by a liquid supply device comprising:

a tightly sealed vessel in which a reactive liquid that is catalytically decomposed to evolve gases is to be filled while leaving a space at the upper portion of the vessel, a cylindrical guide means disposed to the inside of the tightly sealed vessel, a piston means disposed to the inside of the cylindrical guide means and adapted to slide along the inside of the guide means depending on the change of the pressure in the tightly sealed vessel, a spring means for resiliently pressing the piston means toward the inside of the tightly sealed vessel at a predetermined spring force, a pressure-generating catalyst means interlocked with the operation of the piston means and adapted to move into and out of the reactive liquid for catalytically decomposing the reactive liquid to evolve gases upon contact with the reactive liquid, and delivery means for deliverying the reactive liquid out of the tightly sealed vessel due to the increase of the pressure inside the tightly sealed vessel caused by the evolution of the gases.

In the liquid supply device according to the present invention, reactive liquid is filled to the inside of a tightly sealed vessel while leaving a space in the upper portion of the vessel.

Since the pressure inside the tightly sealed vessel is low at the initial stage, the piston means is urged toward the inside of the vessel, that is, to the bottom of the tightly sealed vessel by the spring means and the pressure-generating catalyst interlocking therewith is submerged in the reactive liquid.

Then, as the pressure generating catalyst means is in contact with the reactive liquid, a portion of the reactive liquid is catalytically decomposed and the pressure in the tightly sealed vessel is gradually increased with the gases evolved by the decomposition. Then, when the pressure in the tightly sealed vessel exceeds a predetermined value, the piston means slides along the inside of the cylindrical guide means against the resiliency of the spring means and, interlocking therewith, the pressure-generating catalyst means moves to the outside of the reactive liquid to stop the decomposition of the reactive liquid. Meanwhile the reactive liquid is delivered from the delivery pipe to the outside of the tightly sealed vessel due to the increase of the pressure in the vessel.

Then, when the pressure in the tightly sealed vessel is reduced by the delivery of the reactive liquid, the piston means slides in the opposite direction along the inside of the guide cylinder by the resiliency of the spring means, and the pressure-generating catalyst means submerges into the reactive liquid to start the decomposition of the reaction liquid again.

The operations are repeated subsequently to continuously deliver the reactive solution. Accordingly, it is possible to continuously deliver the entire volume of the reactive liquid our of the tightly sealed vessel without requiring a pump, driving source therefor, etc. and, in addition, no noises are formed upon delivery of the reactive liquid.

The liquid supply device according to the present invention may be applied to a gas generating system, for example, an oxygen gas generating system as proposed previously by the present inventor in the above-mentioned U.S. Patent application.

It is thus another object of the present invention to provide a gas generating system small in size, reduced in cost and capable of deliverying useful gas stably.

The foregoing object of the present invention can be attained by a liquid supply device used in combination with a gas generating system, the system including:

a liquid supply device comprising:

a tightly sealed vessel in which a reactive liquid that is catalytically decomposed to evolve gases is to be filled while leaving a space at the upper portion of the vessel, a cylindrical guide means disposed to the inside of the tightly sealed vessel, a piston means disposed to the inside of the cylindrical guide means and adapted to slide along the inside of the guide means depending on the change of the pressure in the tightly sealed vessel, a spring means for resiliently pressing the piston means toward the inside of the tightly sealed vessel at a predetermined spring force, a pressure-generating catalyst means interlocked with the operation of the piston means and adapted to move into and out of the reactive liquid for catalytically decomposing the reactive liquid to evolve gases upon contact with the reactive liquid, and delivery means for deliverying the reactive liquid out of the tightly sealed vessel due to the increase of the pressure inside the tightly sealed vessel caused by the evolution of the gases, and a catalyst vessel containing catalyst means for catalytically decomposing the reactive liquid delivered from the liquid supply device into a mixture of gas and liquid components in a thermally insulated reaction zone, a flow rate controller connected between the liquid supply device and the catalyst vessel for controlling the flow rate of the reactive liquid, cooling means for cooling the gas-liquid mixture sent from the catalyst vessel, and a gas-liquid separation vessel for separating the gas-liquid mixture sent from the cooling means into respective gas and liquid components for deliverying the gas component for intended external use while draining the liquid component.

The reactive liquid delivered from the liquid supply device along with the increase of the pressure upon catalytic decomposition is sent under flow rate control in the flow rate controller to the catalyst vessel, where the reactive liquid is catalytically decomposed into gas and liquid components effectively in the thermally insulated reaction chamber, cooled by the cooling means, then subjected to gas-liquid separation in the gas-liquid separation vessel and then the gas component is delivered externally for intended use. The reactive liquid supplied from the liquid supply device to the catalyst vessel can be effectively controlled by the flow rate controller under the control of the pressure of the gas generated in the gas-liquid separation vessel and fed back to the controller.

DESCRIPTION OF THE ACCOMPANYING DRAWINGS

These and other objects, as well as advantageous features of the present invention will become apparent by reading the descriptions for preferred embodiments according to the present invention with reference to the accompanying drawings, wherein FIG. 1 is a vertical cross sectional view illustrating a preferred embodiment of a liquid supply device according to the present invention;

DETAILED DESCRIPTION OF THE PREFERRED EMBODIMENT

The present invention is to be explained by way of a preferred embodiment with reference to the accompanying drawings.

Figure 1:
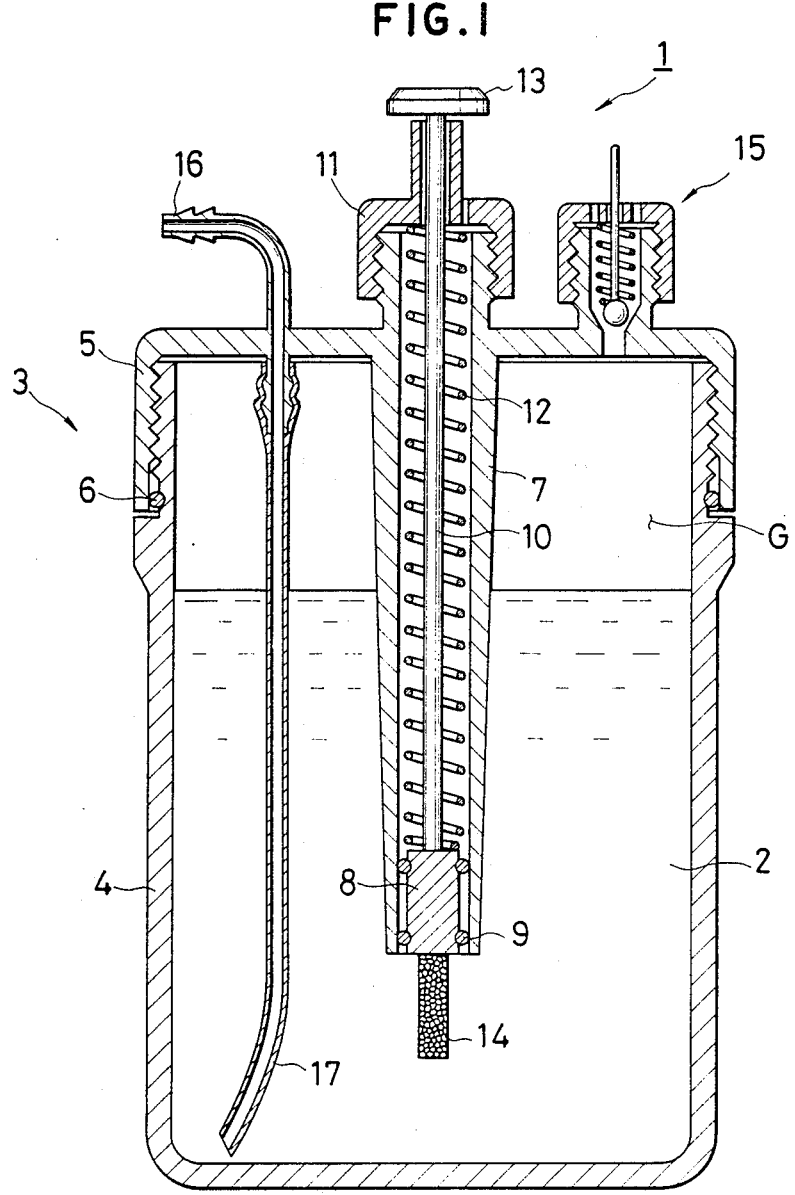

FIG. 1 is a vertical cross sectional view of a liquid supply device as a preferred embodiment according to the present invention, which is to be applied to an oxygen gas generation system described later.

The liquid supply device 1 has a tightly sealed vessel 3 in which an aqueous solution 2 containing hydrogen peroxide ($H_2O_2$) as a reactive liquid (hereinafter simply as aqueous solution) is charged.

As shown in FIG. 1, the vessel 3 comprises a vessel main body 4 made of transparent and acid-resistant material in a pressure-proof structure opened at its upper end, and a gas-tight cover 5 in threaded engagement with the upper opening of the main body 4 by way of an O-ring 6. The aqueous solution 2 is adapted to be charged from the upper opening of the main body 4 to the inside thereof with the space G being left at the upper portion.

A guide cylinder 7 is formed through the gas-tight cover 5 integrally at the central portion thereof and extended in the vertical direction with the lower end thereof being submerged in the aqueous solution 2. A piston 8 is disposed to the inside of the guide cylinder 7 such that it can move slidingly from the inside to the outside of the aqueous solution 2. O-rings 9 are disposed between the piston 8 and the guide cylinder 7 for slidable sealing.

As shown in FIG. 1, a rod 10 is connected at its lower end to the upper end of the piston 8. The upper end of the rod is slidably penetrated through a cap 11 which is screwed over the upper end of the guide cylinder 7. A compressible coil spring 12 is disposed between the cap 11 and the piston 8 for downwardly pressing the piston 8 with a predetermined spring force. A stopper 13 abutting against the upper surface of the cap 11 is attached to the upper end of the rod 10 that protrudes from above the cap 11 for defining lower dead point of the piston 8. The resiliency of the spring 12 for pressing the piston 8 can be adjusted by turning the cap 11 relative to the guide cylinder 7.

While on the other hand, a pressure-generating catalyst 14 for decomposing the aqueous solution 2 to generate oxygen gas is secured to the lower end of the piston 8, so that the pressure in the tightly sealed vessel 3 is gradually increased accompanying the generation of the oxygen gas and, when the gas pressure inside the vessel 3 increases greater than the resilient force of the coil spring 12, the piston 8 moves upwardly along the inside of the guide cylinder 7 against the resiliency of the coil spring 12 to pull-up the pressure-generating catalyst 14 out of the aqueous solution 2 thereby stopping the decomposition of the aqueous solution. Details for the pressure-generating catalyst 14 will be detailed later.

The gas-tight cover 5 also has a safety valve 15 adapted to be opened by the pressure in the tightly sealed vessel 3 when it reaches a predetermined dangerous level, and an exit pipe 16 respectively. The exit pipe 16 is connected at its lower end with a suction pipe 17 reaching the bottom of the vessel main body 4. It is so adapted that the aqueous solution 2 in the vessel 3 is continuously delivered out of the vessel 3 by way of the suction pipe 17 and the exit pipe 16 along with the increase of the inner pressure in the vessel 3 accompanying the generation of the oxygen gas.

Figure 2:
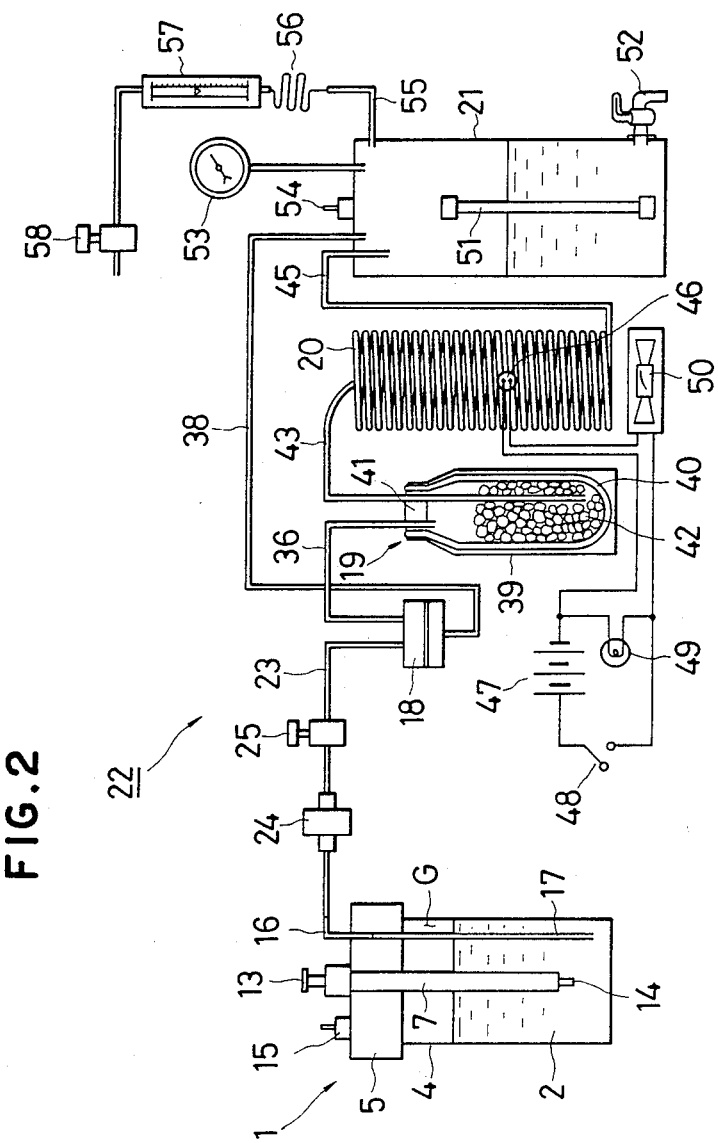
FIG. 2 is an entire schematic view illustrating an oxygen gas generation system to which the liquid supply device shown in FIG. 1 is applied.
Figure 3:
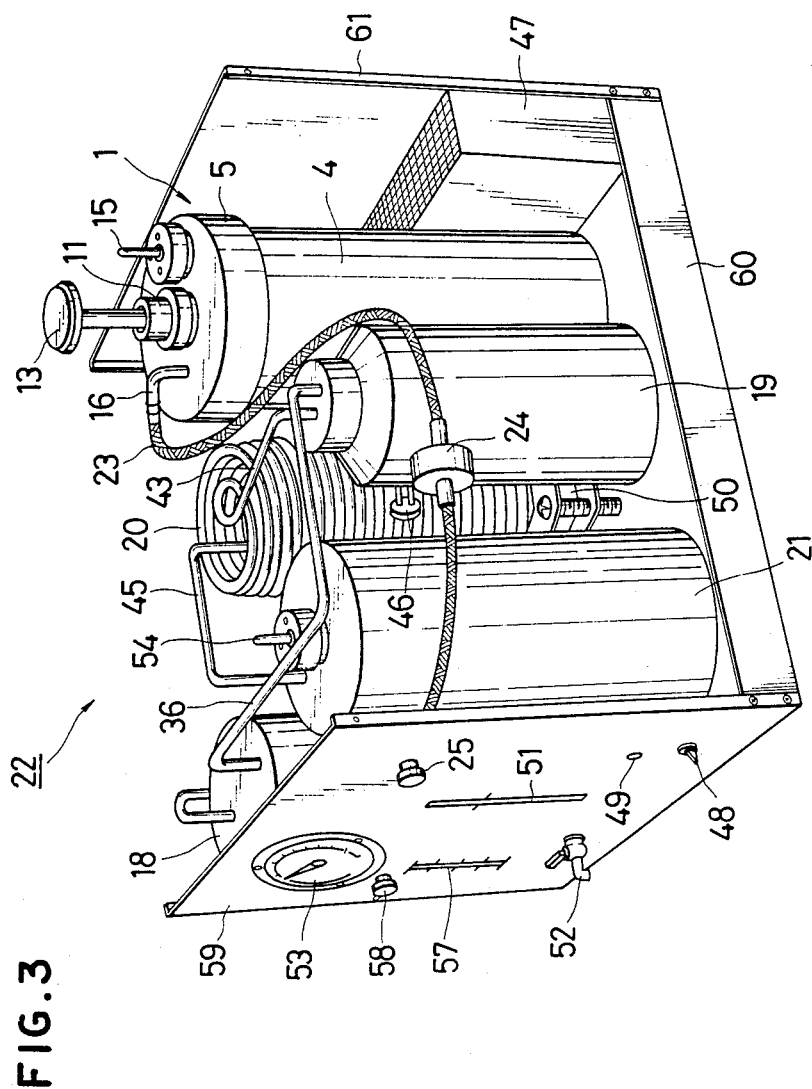
FIG. 3 is a perspective view illustrating the appearance of the entire oxygen gas generation system.

As shown in FIG. 2 and FIG. 3, the liquid supply device 1 of such a constitution can be incorporated into an oxygen generation system 22, together with a flow rate controller 18, a catalyst vessel 19, a cooling coil 20, a gas-liquid separation vessel 21, etc.

As shown in FIG. 2 and FIG. 3, the exit pipe 16 of the liquid supply device 1 is connected to the flow rate controller 18 by way of a supply pipe 23 under pressure made of nitrile rubber, polyvinyl chloride or like other material resistant to the oxidative aqueous solution 2. A filter 24 for removing dusts or precipitates contained in the aqueous solution 2 and a main valve 25 for supplying the aqueous solution 2 to the controller 18 or interrupting the supply thereof are disposed at the midway of the supply pipe 23 respectively. The filter 24 may be of an identical structure with that of a fuel filter used for automobiles.

Figure 4:
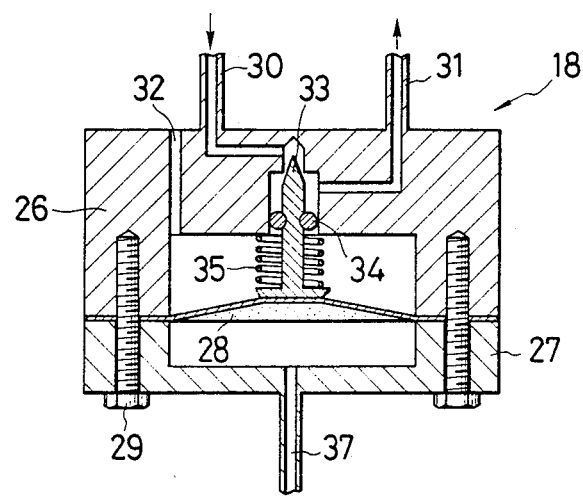
FIG. 4 is a detailed cross sectional view of a flow rate regulator used for the liquid supply device.

As shown in FIG. 4, the controller 18 comprises a main body casing 26 and a flange 27 each made of hard polyvinyl chloride or aluminum alloy, and the casing 26 and the flange 27 are partitioned by means of a diaphragm 28 made of nitrile rubber, etc. disposed therebetween and they are integrally connected to each other by means of bolts 29.

Also as shown in FIG. 4, the casing 26 is formed with an aqueous solution inlet port 30 connected with the supply pipe 23, an aqueous solution exit port 31 and an air port 32 that communicates the inside of the casing 26 with atmosphere, respectively, and also incorporated with a needle valve 33.

The needle valve 33 has an O-ring 34 between the valve body and the casing 26, and a coil spring 35 that always resiliently presses the needle valve 33 toward the diaphragm 28, so that the opening degree of the valve is controlled by the operation of the diaphragm 28.

As shown in FIG. 2 and FIG. 3, a supply pipe 36 is connected at its one end to the aqueous solution exit port 31 and connected at its the other end to the catalyst vessel 19 described later. It is so adapted that the aqueous solution 2 put under flow rate control by the needle valve 33 is supplied by way of the supply pipe 36 to the catalyst vessel 19.

As shown again in FIG. 4, the flange 27 is formed with an oxygen gas inlet port 37, which is connected by way of a pressure gas pipe 38 to the gas-liquid separation vessel 21, so that oxygen gas accumulated in the gas-liquid separation vessel 21 is supplied at an increased pressure to the inside of the flange 27 to actuate the diaphragm 28 depending on the gas pressure and control the opening degree of the needle valve 33. In a case where the amount of the oxygen gas stored in the gas-liquid separation vessel 21 is large, for example, the pressure inside the flange 27 is increased to reduce the amount of the aqueous solution 2 supplied to the catalyst vessel 19. On the other hand, in a case where the amount of oxygen gas accumulated in the gas-liquid separation vessel 21 is small, the pressure inside the flange 27 is decreased to increase the amount of the aqueous solution 2 supplied to the catalyst vessel 19.

As shown in FIG. 2, the catalyst vessel 19 comprises an outer casing 39, a Dewar vessel 40 of known heat insulating structure disposed in the outer casing 30 and a cover 41 fitted to the upper opening of the Dewar vessel 40. A decomposing catalyst 42 is filled in the Dewar vessel 40 for chemically decomposing the aqueous solution 2 introduced by way of the supply pipe 36 to the inside of the Dewar vessel 40.

Each of the decomposing catalyst 42 and the pressure generating-catalyst 14 described above can be prepared by the method of incorporating one or more of noble metal or metal oxide in an amount from 0.001 to 10% by weight into molded and sintered silver powder, or by the method of impregnating under vacuum granular or molded activated carbon with a solution of noble metal such as Pt, Pd, Au, or Ag, or cobalt chloride or manganese nitrate, followed by drying and sintering so as to incorporate from 0.01 to 10% by weight of the noble metal or metal oxide.

It is thus adapted such that the aqueous solution 2 introduced from the supply pipe 36 to the inside of the Dewar vessel 40 is decomposed into oxygen gas and steam upon contact with the decomposing catalyst 42.

Then, a mixture of oxygen gas and steam is introduced by way of a mixture pipe 43 into the cooling coil 20 of high heat exchanging efficiency, for example, made of copper as shown in FIG. 3, in which steam is condensated into water.

As also shown in FIG. 2, another mixture pipe 45 is connected to the downstream end of the cooling coil 20, so as to introduce the mixture of oxygen gas and water from the cooling coil 20 to the gas-liquid separation vessel 21.

As shown in FIG. 2 and FIG. 3, a thermoswitch 46 which is turned on, for example, at a temperature of 60° C. is attached to the outer surface of the cooling coil 20 at the longitudinal center thereof, and a blower 50 is disposed below the cooling coil 20. The blower 50 is connected, as shown in FIG. 2, with the thermoswitch 46, a battery 47, a switch 48 and a pilot lamp 49. It is so adapted that the blower 50 is started upon activation of the thermoswitch 46 (switch 48 being closed) to compulsorily cooling the cooling coil 20 and also light-up the pilot lamp 49.

As shown in FIG. 2 and FIG. 3, the gas-liquid separation vessel 21 is formed as a cylindrical vessel made, for example, of hard polyvinyl chloride. It has a water level gage 51 disposed at the outer surface, a drain cock 52 to the lower end, and a pressure gage 53 and a safety valve 54 at the upper end thereof respectively. The pressure gas pipe 38 and the mixture pipe 45 described previously, as well as an oxygen exit pipe 55 are also connected to the upper end of the gas-liquid separation vessel respectively, so that the mixture comprising oxygen gas and water introduced from the mixture pipe 45 to the gas-liquid separation vessel 21 is subjected to gas-liquid separation into a liquid layer portion and a gas layer portion. Then, the oxygen gas separated from water is delivered to the outside by way of the oxygen exit pipe 55, a capillary 56, a flowmeter 57 and an exit valve 58 successively.

In FIG. 3, a front panel 59, a rack 60 and a rear panel 61 constitute a cabinet. As shown in FIG. 3, main valve 25, switch 48, pilot lamp 49, water level gage 51, drain cock 52, pressure gage 53, flowmeter 57 and exit valve 57 are respectively disposed at the front of the front panel, so that all of manipulations and monitoring can be done at this front panel 59.

OPERATION OF THE SYSTEM

Operation of the preferred embodiment having been constituted as described above is now explained.

In the case of using the liquid supply device 1, the gas-tight cover 5 for the tightly sealed vessel 3 is detached from the vessel main body 4 and an aqueous solution 2 containing hydrogen peroxide at 30% concentration is charged to the inside of the main body 4 while leaving a space G in the upper portion of the vessel 3. Then, the gas-tight cover 5 is attached again as shown in FIG. 1.

At the initial stage after attaching the cover 5 to the main body 4, since the inside of the tightly sealed vessel 3 is at an atmospheric pressure, the piston 8 situates to the lower end of the guide cylinder 7 by the downward biasing force of the coil spring 12 and, accordingly, the pressure-generating catalyst 14 is submerged in the aqueous solution 2 as shown in FIG. 1.

Thus, when the catalyst 14 is in contact with the aqueous solution 2, catalytic decomposing reaction occurs to a portion of the aqueous solution 2 by which oxygen gas is evolved and accumulated in the space G. Then, the pressure in the vessel 3 gradually increases.

As the pressure inside the vessel 3 increases to a level greater than the downward biasing force of the coil spring 12, the piston 8 moves upwardly along the inside of the guide cylinder 7 against the resilient force of the coil spring 12 and the pressure-generating catalyst 14 integrated with the piston 8 is pulled-up to the outside of the aqueous solution 2 to stop the decomposition of the aqueous solution 2. Meanwhile, the aqueous solution 2 is delivered out of the tightly sealed vessel 3 through the suction pipe 17 and the exit pipe 16 by the pressure inside the vessel 3.

When the pressure inside the vessel 3 is decreased by the delivery of the aqueous solution 2 out of the vessel 3, the piston 8 moves downwardly along the inside of the guide pipe 7 by the resilient force of the coil spring 12, causing the catalyst 14 to submerge in the aqueous solution 2 as shown in FIG. 2. Subsequently, the aqueous solution 2 is continuously delivered out of the vessel 3 by repeating the operations described above.

In FIG. 1, the pressure-generating catalyst 14 is not in contact with the bottom of the vessel main body 4, and, if the liquid level of the aqueous solution 2 goes lower than the position for the pressure-generating catalyst 14, decomposition of the aqueous solution 2 is no more taken place. However, since the aqueous solution 2 is delivered from the vessel 3 by the pressure inside the vessel 3, the entire volume of the aqueous solution 2 can be delivered out of the vessel 3 with no particular difficulty.

Then, when the main valve 25 shown in FIG. 2 and FIG. 3 is opened in a state where the aqueous solution 2 is delivered from the liquid supply device 1, the aqueous solution 2 from the liquid supply device 1 is passed through the filter 24 where obstacles are eliminated, put to flow rate control in the flow rate controller 18 as described later and then introduced to the catalyst vessel 19.

The aqueous solution 2 introduced into the catalyst vessel 19 is decomposed in contact with the decomposing catalyst 42 in the catalyst vessel 19 and then introduced as a mixture of oxygen gas and steam to the cooling coil 20. Then, the mixture is air-cooled spontaneously into a mixture of oxygen gas and water while passing through the cooling coil 20, which is then introduced by way of the mixture pipe 45 to the gas-liquid separation vessel 21, where the mixture is separated into oxygen gas and water.

In a case if the atmospheric temperature is high or the flow rate of the oxygen gas required is great, complete steam condensation can not always be obtained only with the spontaneous air cooling by the cooling coil 20.

In view of the above in the present embodiment, the thermoswitch 46 is disposed to the outer surface of the cooling coil 20 at the longitudinal center thereof and the cooling blower 50 is started for applying positive cooling when the thermoswitch 46 detects a temperature, for example, above 60° C. Thus, there is no worry that steams are directly introduced into the gas-liquid separation vessel 21.

According to the experiment made by the present inventor, it has been confirmed that the blower 50 is not actuated even for the continuous operation for about three hours at the atmospheric temperature of 30° C., with the amount of oxygen gas generated of 1000 ml/min, and that there is no requirement for positive cooling so long as the device is used for a small-sized gas torch or oxygen inhaler. The oxygen gas separated from water in the gas-liquid separation vessel 21 is delivered from the oxygen exit pipe 55 to the capillary 56 in which the flow rate is stabilized and then sent out to the outside through the flowmeter 57 and the exit valve 58.

While on the other hand, the oxygen gas is also sent by way of the pressure gas pipe 38 to the flow rate controller 18 and used for maintaining the pressure of the oxygen gas in the gas-liquid separation vessel 21 to a predetermined value.

That is, the oxygen gas from the gas pipe 38 is introduced under pressure from the oxygen gas inlet port 37 to the inside of the flange 27 of the flow rate controller shown in FIG. 4 to urge the diaphragm 28. The needle valve 33 operates vertically in the drawing depending on the movement of the diaphragm 28 to control the flow rate of the aqueous solution 2 delivered from the aqueous solution exit port 31.

For instance, if the pressure of the oxygen gas in the gas-liquid separation vessel 21 is high, the flow rate of the aqueous solution 2 delivered from the aqueous solution exit port 31 is reduced to suppress the amount of the oxygen gas evolved in the catalyst vessel 19. While on the other hand, if the pressure of the oxygen gas in the gas-liquid separation vessel 21 is low, the flow rate of the aqueous solution 2 delivered from the aqueous solution exit port 31 is increased to increase the amount of the oxygen gas generated in the catalyst vessel 19. In view of the above, the gas pressure of oxygen in the gas-liquid separation vessel 21 can be maintained at a pressure determined by the flow rate controller 18.

The reaction of decomposing aqueous hydrogen peroxide into oxygen and water is represented by the following formula:

$$H_2O_2 \rightarrow H_2O + 1/2 O_2 \qquad (1)$$

the heat calorie generated in this reaction is:

$$\Delta H 29.8 = -23.47 \text{ kml}^{-1}\text{mol}^- \qquad (2)$$

which shows that the reaction is exothermic.

Generally, an exothermic decomposing reaction is conducted under cooling, because it has been considered so far that if the exothermic reaction is continued as it is without cooling, the temperature elevates incontrollably in which a mixture of aqueous hydrogen peroxide, steam and oxygen gas are rendered to high temperature and high pressure, thereby causing danger of explosive reaction.

However, according to the experiment made by the present inventor, it has been on the contrary confirmed that such an explosive reaction can occur only when the catalyst is charged to a great amount of aqueous hydrogen peroxide and also that if hydrogen peroxide is added little by little (at a restricted low flow rate) to a great amount of the catalyst, there is no explosion danger in the vessel filled with the catalyst even without cooling. Rather, if aqueous hydrogen peroxide is added to the catalyst under cooling as usual, the decomposing rate of the aqueous hydrogen peroxide is reduced and the elevation of temperature is restricted to below 100° C. Then, water formed by the decomposition of the aqueous hydrogen peroxide remains in the liquidous form in the catalyst-containing vessel, which dilutes the aqueous hydrogen peroxide charged and reduces the reaction rate further, by which unreacted aqueous hydrogen peroxide is released as it is to undesirably worsen the conversion ratio of aqueous hydrogen peroxide.

That is, when the present inventor has reacted aqueous hydrogen peroxide at 35% concentration while cooling it in a glass vessel of about 100 ml volume incorporated with the catalyst as a comparative test, it has been confirmed that aqueous hydrogen peroxide was decomposed substantially to 100% at the oxygen gas generation rate below 100 ml/min. However, unreacted aqueous hydrogen peroxide was released as it was by about 5% at 15 ml/min, about 7% at 300 ml/min and about 10% at 500 ml/min.

In view of the above, in this embodiment, the Dewar vessel 40 having high heat insulating performance is used for the catalyst vessel 19 and the reaction is conducted while minimizing the heat dissipation as low as possible. This enables to decompose aqueous hydrogen peroxide rapidly and completely.

When the present inventor has conducted the experiment using the catalyst vessel 19 under the identical conditions, it has been confirmed that there was no release of unreacted aqueous hydrogen peroxide even if the flow rate of the oxygen gas evolved was increased to 1000 ml/min. In this case, the temperature inside the Dewar vessel 40 was 120°-140° C.

Then, explanation is to be made for the method of preparing the pressure-generating catalyst 14 and the decomposing catalyst 42 used in this embodiment.

The present inventor prepared each of the catalysts 14 and 42 by the following four methods. (1) Silver powder of 100 mesh was molded in a hydraulic press (300 kg/cm²) and then sintered in a hydrogen gas stream at 380° C. for 6 hours to prepare sintering product (support). Then, after impregnating under vacuum the sintering product with a 3% solution of chloroplatinic acid rendered acidic with hydrochloric acid, it was dried at room temperature over one day and one night, treated at 115° C. for 3 hours and at 150° C. for one hour to eliminate water, and then heated for reduction in a hydrogen gas stream at 200° C. for one hour. The silver sintering product was incorporated with platinum in a range from 0.001 to 10% by weight by repeating the foregoing procedures or controlling the concentration of chloroplatinic acid. (2) Silver powder of 300 mesh was used and treated in the same procedures as those in the method (1) above. (3) The silver sintering product was incorporated with noble metal or metal oxide such as palladium, gold, cobalt oxide, manganese dioxide, etc. by the same procedures as those in the method (1) above, by using palladium chloride, gold chloride, cobalt chloride, manganese nitrate, etc. instead of chloroplatinic acid. (4) Activated carbon with 3 to 5 mm average pore size was impregnated under vacuum with a solution of chloroplantinic acid, palladium chloride, gold chloride, cobalt chloride and manganese nitrate and the activated carbon was incorporated with noble metal such as platinum, palladium or gold, or metal oxide such as of cobalt oxide, manganese dioxide, etc. within a range from 0.01 to 10% by weight by the same procedures as those in the method (1) above.

No substantial difference was recognized between each of the catalysts prepared by the four methods described above with respect to the decomposing rate of the aqueous hydrogen peroxide, and satisfactory effect can be obtained with any of them. However, the sintered silver powder type catalyst was satisfactory for the catalyst life, in which the catalytic activity was not reduced even after the elapse of about 1000 hours in continuous use.

In the catalyst of the type using activated carbon, about 10% catalyst was destructed to powderize for about 100 hours in continuous use, but no remarkable change was recognized for the decomposing rate of aqueous hydrogen peroxide.

As has been described above, in the preferred embodiment according to the present invention, since the aqueous solution 2 filled to the inside of the tightly sealed vessel 3 is decomposed by the pressure-generating catalyst 14 and the aqueous solution 2 is delivered by the pressure of the gas evolved upon decomposition, the aqueous solution 2 can be delivered continuously without using a pump, a driving source therefor, etc. This can eliminate noisy sounds upon delivery of the aqueous solution 2, as well as make the liquid supply device small in size and reduced in cost.

Figure 5:
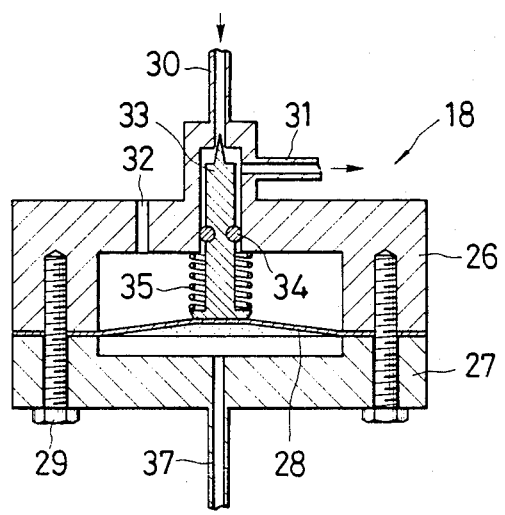
FIG. 5 is a detailed cross sectional view of another embodiment of the flow rate controller.

In the flow rate controller 18 for maintaining the pressure constant in the gas-liquid separation vessel 21, the aqueous inlet port 30 and the aqueous exit port 31 are disposed in parallel on the upper surface of the main body casing 26 but, as shown in FIG. 5, a controller 18 in which both of the ports 30 and 31 are in perpendicular to each other may be used.

Further, although explanations have been made to the embodiment in which the gas-generating catalyst 14 is secured to the lower end of the piston 8, it may be adapted such that the pressure-generating catalyst 14 is, for example, fixed to the top end of an arm vertically swinging around one end as a pivotal center and the intermediate portion of the arm is connected by means of wires, etc. to the piston 8, so that the pressure-generating catalyst 14 moves between the inside and the outside of the aqueous solution 2 interlocking with the piston 8. In this case, it is not always necessary that the piston 8 slides vertically but it may slide laterally.

Furthermore, although aqueous hydrogen peroxide is used as the aqueous solution 2 in the foregoing embodiment, it may be any kind of aqueous solutions capable of releasing oxygen gas upon catalytic decomposition such as an aqueous solution of urea peroxide ($CO(NH_2)_2 \cdot H_2O_2$), barium peroxide ($BaO_2$), sodium peroxide ($Na_2O_2$) or peroxo acid ($H_2S_2O_8$, etc.). Since the above-exemplified peroxides are usually available in the powdery form, they can be carried about with ease and formulated into the aqueous solution 2 by merely adding water in the tightly sealed vessel 3.

Furthermore, although explanation has been made in the case of assembling the liquid supply device 1 of this embodiment into the oxygen generation system 22, it may be applied to a nitrogen gas generation system by using a suitable compound such as hydrazine as the aqueous solution 2.

As has been described above, according to the present invention, since the reactive solution in the tightly sealed vessel is decomposed by the pressure-generating catalyst and the reactive solution is delivered out of the tightly sealed vessel by the pressure of gas evolved by decomposition, the entire volume of the reactive solution in the vessel can continuously be delivered without using pump, etc. and with no noisy sounds.

In addition, since the pressure-generating catalyst repeates the operations of moving to the outside of the reaction solution if the pressure in the tightly sealed vessel exceeds a predetermined value and moving into the reactive solution again when the pressure in the vessel is lowered, the pressure in the vessel can be made constant to stabilize the delivery of the reactive solution.

It should also be understood that the foregoing relates to only a preferred embodiment of the invention, and that it is intended to cover all changes and modifications of the example of the invention herein chosen for the purposes of the disclosure, which do not constitute departures from the spite and scope of the invention.

What is claimed is:
1. A liquid supply device comprising:
   a tightly sealed vessel containing said reactive liquid, wherein said reactive liquid is catalyically decomposed to evolve gases while leaving a space at the upper portion of said vessel,
   a cylindrical guide means disposed to the inside of said tightly sealed vessel,
   a piston means disposed to the inside of said cylindrical guide means so as to slide along the inside of said guide means depending on the change of the pressure in said tightly sealed vessel,
   a spring means for resiliently pressing said piston means toward the inside of said tightly sealed vessel at a predetermined spring force,
   a pressure generating catalyst means attached to said piston means so as to move with the piston means into and out of the reactive liquid for catalytically decomposing the reactive liquid to evolve gases upon contact with the reactive liquid, and
   delivery means for delivering the reactive liquid out of said tightly sealed vessel due to the increase of the pressure inside said vessel caused by the evolution of the gases.

2. The liquid supply device as defined in claim 1, wherein said reactive liquid is one capable of evolving oxygen gas.

3. The liquid supply device as defined in claim 1, wherein said reactive liquid is one capable of evolving nitrogen gas.

4. The liquid supply device as defined in claim 1, wherein the tightly sealed vessel has a safety valve which is constructed so as to open when the pressure inside the tightly closed vessel exceeds a predetermined value.

5. The liquid supply device as defined in claim 1, wherein the cylindrical guide means is extended vertically from the upper end of the tightly sealed vessel into a lower zone of the vessel where the reactive liquid is contained.

6. A gas generating system, said system including:
   a liquid supply device comprising:
   a tightly sealed vessel in which a reactive liquid that is catalytically decomposed to evolve gases is to be added while leaving a space at the upper portion of said vessel,
   a cylindrical guide means disposed to the inside of said tightly sealed vessel,
   a piston means disposed to the inside of said cylindrical guide means so as to slide along the inside of said guide means depending on the change of the pressure in said tightly sealed vessel,
   a spring means for resiliently pressing said piston means toward the inside of said tightly sealed vessel at a predetermined spring force,
   a pressure generating catalyst means attached to said piston means so as to move with the piston means into and out of the reactive liquid for catalytically decomposing the reactive liquid to evolve gases upon contact with the reactive liquid, and
   delivery means for delivering the reactive liquid out of said tightly sealed vessel due to the increase of the pressure inside said vessel caused by the evolution of the gases, and
   a catalyst vessel containing catalyst means connected to said delivery means for catalytically decomposing the reactive liquid delivered from said liquid supply device into a mixture of gas and liquid components in a thermally insulated reaction zone,
   a flow rate controller connected between said liquid delivery means and said catalyst vessel for controlling the flow rate of the reactive liquid,
   cooling means connected to said catalyst vessel for cooling said mixture of gas and liquid formed in the catalyst vessel, and a gas-liquid separation vessel connected to said cooling means for separating said mixture of gas and liquid sent from said cooling means into respective gas and liquid components for delivering the gas component for intended external use while draining the liquid component.

7. The gas generating system as defined in claim 6, further including a gas pressure pipe connected to the gas-liquid separation vessel and said flow rate controller so as to control the flow rate of the reactive liquid from the liquid supply device to the catalyst vessel depending on the pressure of the gas evolved in the gas-liquid separation vessel.

8. The gas generating system as defined in claim 6, wherein the flow rate of the reactive liquid in the controller is controlled depending on the pressure of the gas separated in the gas-liquid separation vessel.

* * * * *